United States Patent Office 3,529,689
Patented Sept. 22, 1970

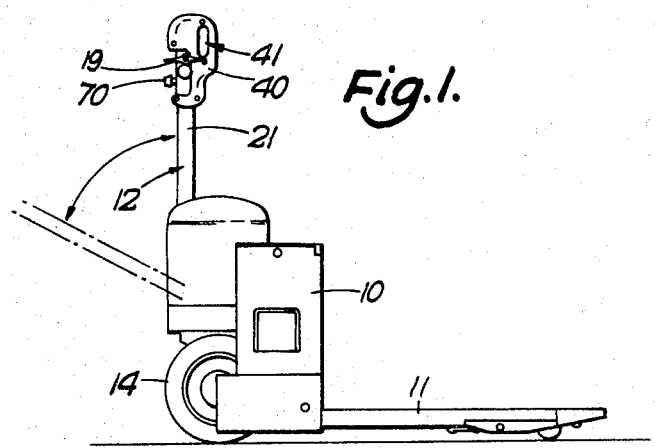
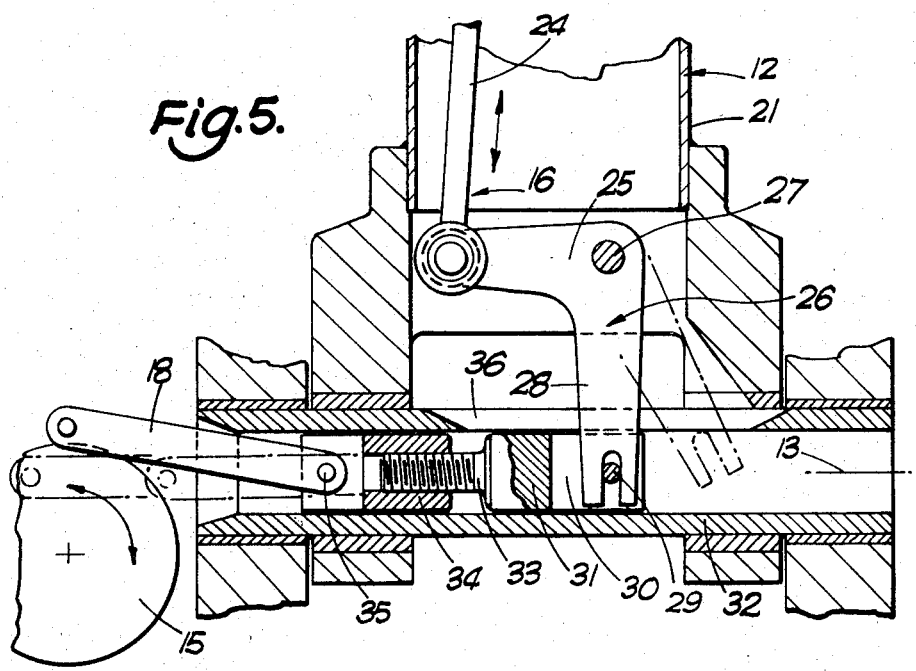

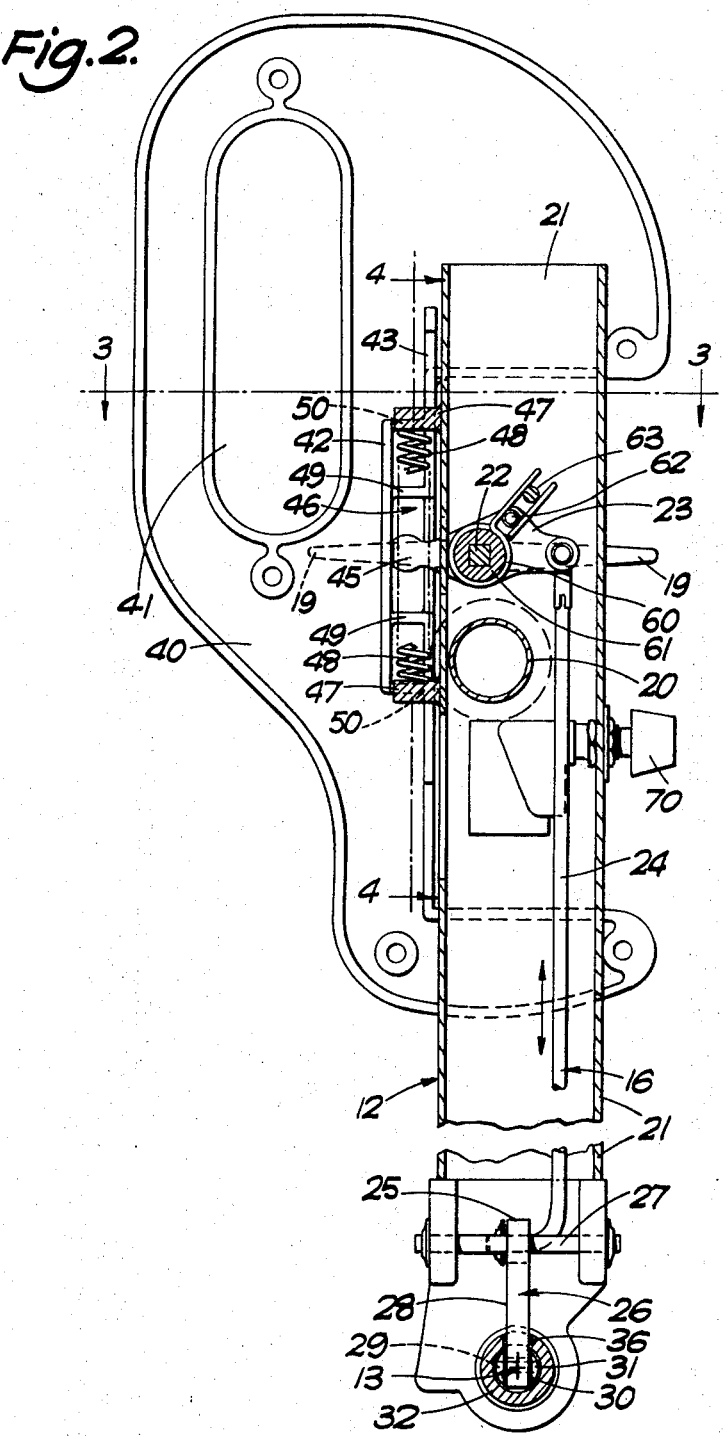

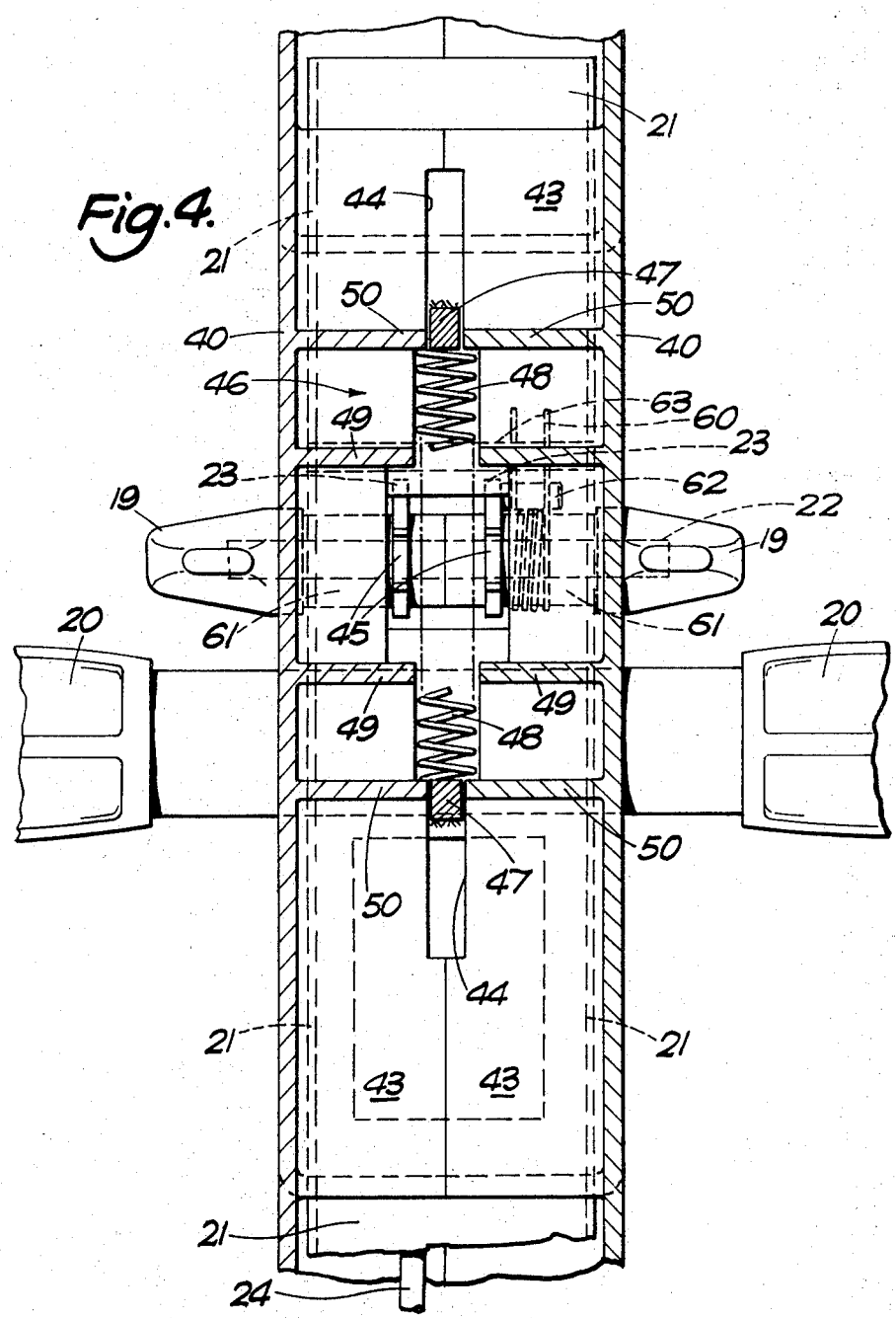

3,529,689
PEDESTRIAN OPERATED INDUSTRIAL TRUCKS
Cecil Goodacre and Brian Thomas Croft, Basingstoke,
England, assignors to Lansing Bagnall Limited, Basingstoke, England, a British company
Filed July 8, 1968, Ser. No. 743,093
Claims priority, application Great Britain, July 6, 1967,
31,150/67
Int. Cl. B62d 51/04
U.S. Cl. 180—19
10 Claims

ABSTRACT OF THE DISCLOSURE

A pedestrian operated industrial truck comprises a body portion, a combined steering and control arm mounted on one end of the body portion, and direction and speed control means connected by a mechanical linkage to operator control means mounted on the control arm. The control arm comprises a first part which is mounted on the body portion and a second part which extends beyond the first part and which is in sliding relation therewith, the second part being spring-urged into an extended position but being movable from said extended position along the first part of the control arm towards the body portion. Also the said linkage has a member which lies in the path of the second part of the control arm when it is slid along the first part towards the body portion whereby when the truck is moving in the direction in which the control arm leads, the said second part of the control arm may be caused to slide along the first part towards the body portion so that the said second part engages the said member of the linkage and operates the linkage to effect a reversal of the direction of movement of the truck.

---

This invention relates to pedestrian operated industrial trucks.

According to the invention a pedestrian operated industrial truck comprising a body portion, a combined steering and control arm mounted on one end of the body portion, and direction and speed control means connected by a mechanical linkage to operator control means mounted on the control arm, movement of the linkage in one direction or the other from a neutral position first determining the direction of movement of the truck and then the speed of the truck in that said direction is characterised in that the control arm comprises a first part which is mounted on the body portion and a second part which extends beyond the first part and which is in sliding relation therewith, the second part being spring-urged into an extended position but being movable from said extended position along the first part of the control arm towards the body portion, and in that the said linkage has a member which lies in the path of the second part of the control arm or a member movable thereby during the said sliding movement of the second part along the first part towards the body portion whereby when the truck is moving in the direction in which the control arm leads, the said second part of the control arm may be caused to slide along the first part towards the body portion so that the said second part or the said member movable thereby engages the said member of the linkage and operates the linkage to effect a reversal of the direction of movement of the truck.

Preferably the linkage is spring-urged into its said neutral position.

It is also preferred that the said second part of the control arm is also movable from its said extended position along the first part of the control arm away from the body portion, the said member or another member of the linkage lying in the path of the second part during its said sliding movement along the first part away from the body portion whereby the said second part of the control arm may be caused to slide along the first part away from the body portion so that the second part or the said member movable thereby engages the said member or the said other member of the linkage and operates the linkage to effect movement of the truck in the direction in which the control arm leads.

The said second part of the control arm preferably comprises a handle portion.

Preferably the direction and speed control means are mounted on the body portion of the truck, the said first part of the control arm is tubular and the said linkage extends along the said tubular first part of the control arm. In this case it is preferred that the control arm is pivotally mounted on the body portion of the truck and the direction and speed control means are operated by a link of the said linkage which is pivotally connected to the remainder of said linkage and which extends substantially along the pivotal axis of the control arm.

By way of example, a specific embodiment in accordance with the invention will now be described with reference to the accompanying drawings in which:

FIG. 1 is a side elevation of a pedestrian operated industrial truck;

FIG. 2 is a sectional side elevation of the control arm of the truck shown in FIG. 1, the section being taken along the line 2—2 in FIG. 3;

FIG. 4 is a section along the line 4—4 in FIG. 2; and

FIG. 5 is a sectional elevation of part of the direction and speed control linkage.

Figure 3:
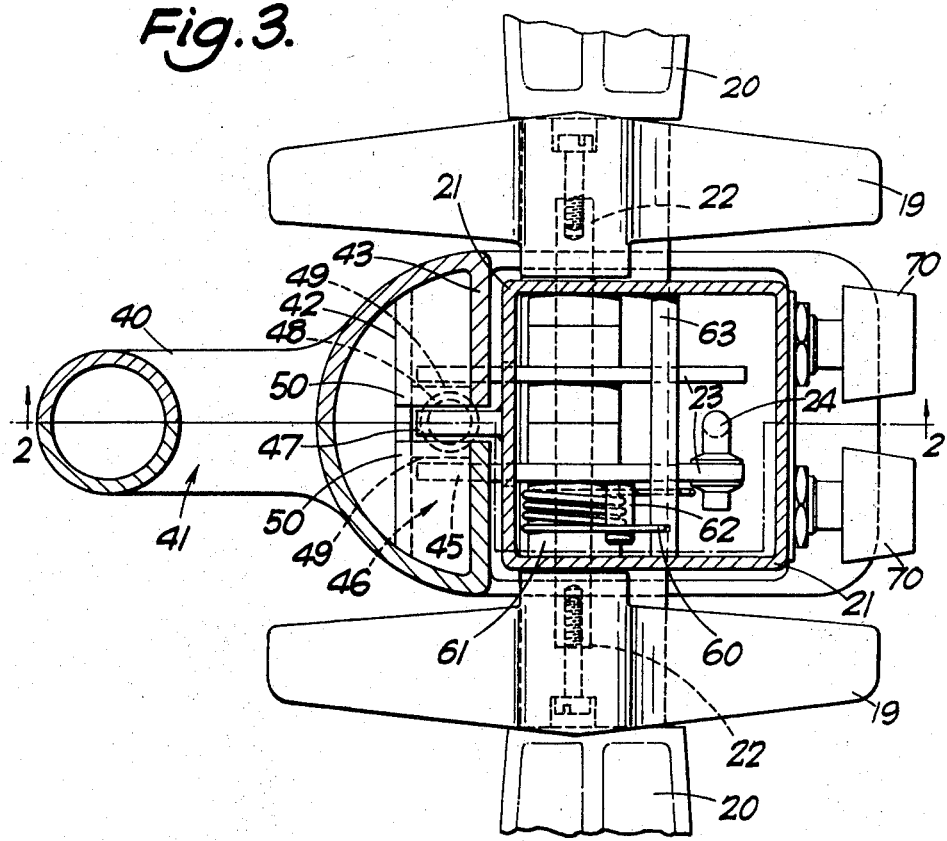
FIG. 3 is a section along the line 3—3 in FIG. 2.

With reference to the drawings, a pedestrian operated industrial truck comprises a body portion 10 having a load carrying portion 11 mounted thereon, and a combined steering and control arm 12 pivotally mounted on the body portion at the end of the body portion which is remote from the load carrying portion, about a horizontal axis 13 (see FIG. 5) extending transversely of the truck and also a vertical axis. Pivotal movement of the control arm about the horizontal axis 13 applies and releases brake mechanism on the truck, the control arm being spring-loaded into its vertical position. Also pivotal movement of the control arm about the said vertical axis effects steering movements of a driven steerable ground wheel 14 mounted below the body portion, the wheel 14 being provided with an electric driving motor mounted in the hub of the wheel. Handles 20 are provided on the control arm to enable the operator to pivot the arm 12 about the said vertical axis to steer the truck.

The load carrying portion 11 of the truck may be raised and lowered relatively to the body portion 10 by means of one or more jacks (not shown) operated by lift and lower buttons 70 provided on the control arm 12.

The direction and speed of the truck is determined by rotary control means or a transductor 15 (see FIG. 5) which is controlled by a linkage 16 extending along the control arm 12 and connecting the rotary control means to operator controls mounted on the control arm. This invention relates to the construction of the control arm 12 and the linkage 16 and thus the remainder of the description will be limited thereto.

Direct actuation of the rotary control means 15 is effected by a lever 18 (see FIG. 5) extending generally longitudinally of the horizontal pivot axis 13 of the control arm 12. Longitudinal movement of this lever 18 from its neutral position shown will first determine the direction of movement of the truck and further movement will increase the speed of the truck. In this example, longitudinal movement of the lever 18 to the right as viewed in FIG. 5 will effect movement of the truck in the direction in which the control arm 12 leads the body portion 10 and movement of the lever to the left will effect movement of the truck in the opposite direction, i.e. the direction in which the body portion 10 leads the control arm 12.

On the control arm itself, there are provided two pairs of butterfly levers 19, comprising the above-mentioned operator controls. These levers are mounted on a tubular part 21 of the control arm, which part 21 is the part of the arm which is pivotally mounted on the body portion of the truck. The pairs of levers 19 are mounted, one pair on either side of the control arm, on a spindle 22 passing through the part 21 of the control arm. The spindle 22 also carries a pair of levers 23, one of which is connected to one end of a link 24. Each of the levers 23 also projects through a slot in the wall of the part 21 for the purpose described below. The link 24 extends longitudinally and internally of the tubular part 21 of the control arm and is connected at its other end to one arm 25 of a bell-crank lever 26 pivotally mounted at 27. The other arm 28 of the bell-crank lever 26 is pivotally connected to a pin 29 passing between the arms 30 of the forked end of a piston 31 mounted for sliding movement along a horizontal sleeve 32. The piston rod 33 of this piston 31 is externally screw-threaded for engagement by the internally screw-threaded bore of a second piston 34. The end of the second piston 34 remote from the first-mentioned piston 31 is forked and is provided with a transverse pin 35 for connection of the piston 34 to the aforesaid lever 18. Hence, longitudinal movement of the link 24 up the control arm, i.e. towards the butterfly levers 19, will effect longitudinal movement of the lever 18 to the left as viewed in FIG. 5. Similarly, downward longitudinal movement of the link 24 will effect longitudinal movement of the lever to the right as viewed in FIG. 5. The truck operator is thus able to control the direction and speed of the truck by rotating either pair of butterfly levers 19 in the desired direction. Automatic return of the butterfly levers 19 to their neutral pisition, on release of pressure by the operator, is affected by means of a coil spring 60 (see FIG. 2) wrapped around a bush 61 carried by the spindle 22, the ends of the spring being located on either side of a pin 62 fixed to one of the levers 23 and also a second pin 63 extending transversely of and fixed to the tubular part 21 of the control arm 12.

The axis of the sleeve 32 is coincident with the horizontal pivot axis 13 of the control arm 12 so that pivotal movement of the control arm about the axis 13 will not effect any substantial longitudinal movement of the link 18, rotation of the first-mentioned piston 30 relatively to the second piston 34 being permitted by the threaded connection between the two pistons. A slot 36 is provided in the wall of the sleeve 32 to permit pivotal movement of the bell-crank lever 26.

In addition to the tubular part 21, the control arm 12 also comprises a head part 40 mounted for sliding movement on the end of the tubular part 21 which is remote from the body portion of the truck, the head part being located externally of the tubular part and extending beyond the said end of the tubular part, i.e. towards the operator. The head part 40 has a slot 41 by which it may be gripped by the truck operator. The head part 40 also has a pair of webs 42, 43 extending parallel to each other and also to the spindle 22 carrying the butterfly levers 19 and the levers 23. The web 43 which is nearest to the tubular part 21 is provided with a slot 44 extending longitudinally of the tubular part 21 whereby the adjacent ends 45 of the levers 23, which as aforesaid, project through the wall of the tubular part, may project into the recess 46 formed between the webs 42, 43. In the neutral position of the butterfly levers 19, as shown, the ends 45 are located centrally within the recess 46. The ends of the recess 46 are defined by stops 47 projecting from and fixed to the adjacent wall of the tubular part 21. These stops 47 pass through the slot 44 and retain the head part 40 in alignment with the tubular part during sliding movement of the head part along the tubular part. On either side of each stop 47 is a lateral extension of the web 42 which provides a seating 50 for a coil spring 48 extending longitudinally of the recess 46 and hence of the control arm 12. The spring 48 tends to prevent relative sliding movement between the head part 40 and the tubular part 21 of the control arm. Above and below the end 45 of each lever 23 and intermediate the ends of the recess 46 is a further stop 49 extending between the webs 42, 43 and fixed to the web 43 (see especially FIG. 2).

As shown most clearly in FIG. 2, the stops 49 are spaced from the end 45 of their respective lever 23 by such a distance that rotation of the levers 23 by the butterfly levers 19 does not effect relative sliding movement of the head part 40 and the tubular part 21 of the control arm. However, if the truck is moving in the direction in which the control arm leads the body portion of the truck, the end 45 of each lever 23 will be nearer the upper stop 49 than the lower stop of the pair of stops 49 associated therewith. Thereby, if during this movement of the truck, the head part 40 is slid along the tubular part 21 of the control arm towards the body portion of the truck, the said upper stops 49 will engage their respective levers 23 and will move them downwardly so actuating the linkage 16 to reduce the speed of the truck, to stop the truck or to reverse the direction of movement of the truck, depending on the amount of sliding movement. This actuation of the linkage 16 will also move the butterfly levers 19 in unison therewith, thereby removing the effect of any finger pressure which the operator may be still applying to the butterfly levers and also rending to instruct the operator to release the butterfly levers.

Similarly, if the truck is moving in the opposite direction, i.e. in which the body portion leads the control arm, sliding movement of the head part 40 along the tubular part 21 of the control arm away from the body portion of the truck will result in the lower stops 49 achieving the same result.

With regard to the first case in which the truck is moving in a direction in which the control arm leads the body portion of the truck, the truck operator would be positioned in front of the control arm and the situation may arise in which the operator becomes trapped between the control arm and an obstacle, e.g. a wall. In this situation, pressure from the body of the operator on the end of the head part 40 will effect the said sliding movement of the head part along the tubular part of the control arm towards the body portion of the truck and sufficient pressure will effect a reversal of the direction of the truck. On removal of this pressure, the spring 48 will return the head part to its normal position and the further spring 60 will return the levers 23 and the butterfly levers 19 to their neutral position, the truck thereby being brought to a standstill.

However, the second case is also advantageous since during movement of the truck in the opposite direction, i.e. in which the body portion of the truck leads the control arm, the operator is able to effect a reversal of the direction of the truck by pulling on the head part 40.

It will be appreciated that in both these cases, the sliding action of the head part 40 comprises a safety feature which is capable of effecting a reversal of the movement of the truck. However, this feature is also capable of effecting movement of a stationary truck. For example, if it is desired to move the truck in a direction in which the control arm leads this can be achieved by pulling the head part 40 so that it slides along the tubular part 21, i.e. away from the body portion, the lower stops 49 engaging the ends of the levers 23 and moving them upwardly to actuate the linkage 16 to cause the control means 15 to move the truck in the direction which the control arm leads. If the operator stops when moving the truck in this direction, the relative movement between the stationary head part 40 and the tubular part 21 will automatically cause the levers 23 and the linkage 16 to return to their neutral position.

The invention is not restricted to the specific details of the embodiment described above. For example, the linkage 16 may be operable by a member movable by the head part 40 rather than by the head part directly.

Also the truck may be provided with a control arm having a head part 40 that is not slidable along the tubular part 21 away from the body portion, from its normal or extended position, or at least is not provided with means for operating the linkage 16 when it is slid away from the body portion.

We claim:

1. A pedestrian operated industrial truck comprising a body portion, a combined steering and control arm mounted on one end of the body portion, and direction and speed control means connected by a mechanical linkage to operator control means mounted on the control arm, movement of the linkage in either direction from a neutral position first determining the direction of movement of the truck and then the speed of the truck in that said direction, wherein the control arm comprises a first part which is mounted on the body portion and a second part which extends beyond the first part and which is in sliding relation therewith, the second part being spring urged into an extend position but being movable from said extended position along the first part of the control arm towards the body portion, wherein the operator control means comprise a manipulating member which is movably mounted on said first part of the control arm and movement of which effects said movement of the linkage, and wherein the linkage has a member which lies in the path of the second part of the control arm during the said sliding movement of the second part along the first part towards the body portion, whereby when the truck has been caused, by movement of the manipulating member, to move in the direction in which the control arm leads, the said second part of the control arm may be caused to slide along the first part towards the body portion so that the said second part engages the said member of the linkage and operates the linkage to effect a reversal of the direction of movement of the truck.

2. A truck as claimed in claim 1 in which the linkage is spring-urged into its said neutral position.

3. A truck as claimed in claim 1 in which the said second part of the control arm is also movable from its said extended position along the first part of the control arm away from the body portion, the said member of the linkage lying in the path of the second part during its said sliding movement along the first part away from the body portion whereby the said second part of the control arm may be caused to slide along the first part away from the body portion so that the second part engages the said member of the linkage and operates the linkage to effect movement of the truck in the direction in which the control arm leads.

4. A truck as claimed in claim 1 in which the said second part of the control arm comprises a handle portion.

5. A truck as claimed in claim 1 in which the said second part of the control arm is arranged for sliding movement externally of the first part.

6. A truck as claimed in claim 1 in which the said first part of the control arm is tubular and in which the said member of the said linkage projects through an aperture in the said first part of the control arm into the said sliding path of the said second part.

7. A truck as claimed in claim 1 in which the direction and speed control means are mounted on the body portion of the truck, in which the said first part of the control arm is tubular and in which the said linkage includes a link extending along the said tubular first part of the control arm.

8. A truck as claimed in claim 7 in which the control arm is pivotally mounted on the body portion of the truck and in which the direction and speed control means are operated by a link of the said linkage which is pivotally connected to the remainder of said linkage and which extends substantially along the pivotal axis of the control arm.

9. A truck as claimed in claim 1 in which guide means are provided to guide the said second part of the control arm during its said sliding movement along the first part, which guide means comprise at least one member which is fixed to the first part of the control arm and which projects into a longitudinal slot in the second part.

10. A truck as claimed in claim 1 in which the load carrying portion is mounted on the end of the body portion remote from the control arm, and means are provided for raising and lowering the said load carrying portion relatively to the body portion, operator controls therefor being mounted on the control arm of the truck.

References Cited

UNITED STATES PATENTS

| 2,138,239 | 11/1938 | Irgens. |
| 2,879,858 | 3/1959 | Thomas. |
| 2,937,706 | 5/1960 | Chandler. |
| 3,225,853 | 12/1965 | Norton et al. |
| 3,291,243 | 12/1966 | Friesser _____ 180—19 |

FOREIGN PATENTS

| 991,730 | 5/1965 | Great Britain. |

BENJAMIN HERSH, Primary Examiner

J. A. PEKAR, Assistant Examiner